Aug. 21, 1962   C. H. BORNEMAN   3,050,027
DEVICE AND PROCESS FOR MACHINING OPERATIONS
Filed Aug. 2, 1960
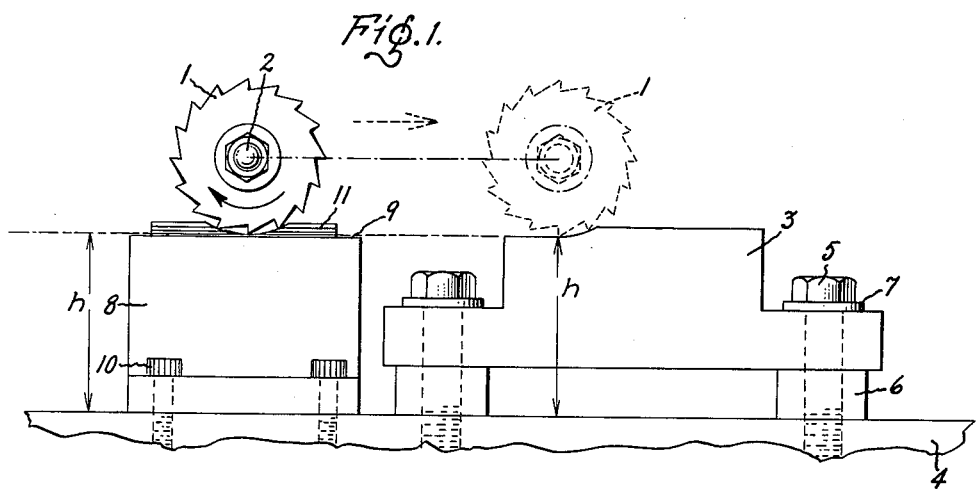
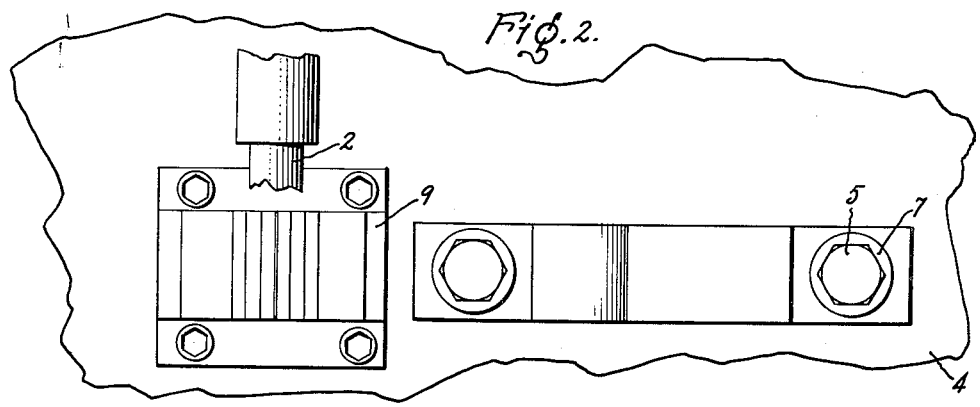
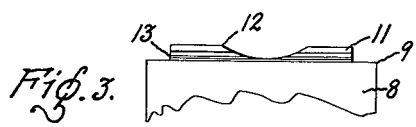
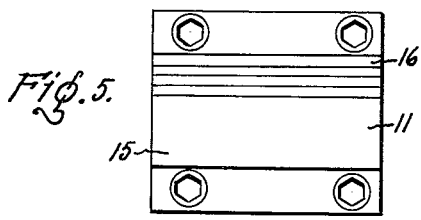
INVENTOR.
Christian H. Borneman
BY Paul A. Frank
His Attorney

United States Patent Office 3,050,027
Patented Aug. 21, 1962

3,050,027
DEVICE AND PROCESS FOR MACHINING OPERATIONS
Christian Henry Borneman, Scotia, N.Y., assignor to General Electric Company, a corporation of New York
Filed Aug. 2, 1960, Ser. No. 47,098
4 Claims. (Cl. 116—114)

My invention relates to machining operations and, in particular, to methods and apparatus for precisely positioning a machine tool for engagement with the surface of a work piece.

In certain machining operations; for example, metal cutting, scraping or abrading, it is desirable to know the distance between the cutting, scraping or abrading tool and the surface of a gaging surface, or, alternatively, the work piece, so that the machine may be adjusted first for rough cuts and finally for finishing cuts of the tool in relation to the work piece. In the past, it has been customary to use metal feelers between such a tool and the surface of the work piece or gaging surface. However, such a practice not only is not the most accurate method, but also is time consuming and many times a dangerous procedure.

Accordingly, it is an object of my invention to provide a new and improved device and method of machining which facilitates such operations and assists the machine operator to rapidly determine the distance of a tool from a work surface.

It is still another object of my invention to provide an indicating device which may be attached to a work piece to accurately indicate visually the distance of a tool from the work piece.

In accordance with one aspect of my invention, I provide methods and a device for expediting the machining of a work piece which consists in attaching to an appropriate gaging surface, or a surface of the work piece, a tab consisting of a plurality of layers of different colors so that as a machine tool approaches the surface to be machined, the layers will be successively removed to provide a visual indication of the distance to the surface. In one of its forms, the device or tab may consist of layers of different thicknesses so that more rapid machining may be performed during the initial machining operation and slower machining during the final passes of the machine tool.

The novel features which I believe to be characteristic of my invention are set forth with particularity in the appended claims. My invention itself, however, may best be understood by reference to the following description taken in connection with the accompanying drawings, in which—

FIG. 1 is a side view of a portion of a machine tool incorporating the device of my invention;

FIG. 2 is a top plan view of the apparatus illustrated in FIG. 1;

FIGS. 3–5 illustrate different forms of the indicating tab employed in my improved machining process.

FIG. 1 illustrates a milling operation in whihch a milling tool 1 mounted for rotation about the axis of a shaft 2 is employed to machine a work piece 3. The work piece 3 is mounted directly on the table or bed 4 of the milling machine by means of cap screws 5 and spacers 6, or in a jig or fixture (not shown) attached to the machine table. Washer 7 may be positioned between the cap screws and the work piece. Positioned adjacent work piece 3 is a gaging member 8 having a tool setting surface 9. The gaging member 8 is affixed to the bed of the milling machine, or attached to the work piece holding jig or fixture, by means of a plurality of bolts 10.

In usual machining practice, the work piece 3, the upper level of which extends above the tool setting surface 9, is milled by successive passes of the tool 1 across the upper surface of the work piece. As the desired height of the work piece is approached by successive passes from left to right, the operator gages the distance between the teeth of the milling tool and the tool setting surface 9 by means of metal feelers. This practice not only is not as accurate as desired, but is time consuming and presents certain dangers to the operator. In accordance with my invention, the use of such metal feelers, or other devices, is obviated by means of an indicating device 11 affixed to the tool setting surface 9 for engagement by the milling tool 1. The indicating device 11 is in the form of a tab which may have an adhesive lower surface so that it can be attached to surface 9 by a slight pressure. The tab itself comprises a plurality of layers of readily machinable material of known thickness, successive layers being of different colors. The indiidual layers may be pasted, glued, or adhesively joined together and may be formed of paper strips, or, alternatively, may comprise a plastic material, metal layers, or any other readily machinable material. As previously mentioned, the material of adjacent layers are of different colors and, preferably, have vivid contrasting colors. The tab or indicating device 11 may be applied as a gummed sticker, a precoated adhesive tape, or it may be cemented, soldered or brazed to the gaging surface. Obviously, it could also be mechanically attached to the surface.

In operation, tab 11 is applied to the gaging surface, or, alternatively, to a surface of the work piece itself. The machining tool is then rapidly adjusted to position in relation to the surface and one or more rough cuts taken by the machine tool. As the operator is warned by the change in color of the currently exposed layer of tab 11, he can readily reduce the thickness of the cut taken by his tool so that when the final layer of tab 11 is removed, he is making the final or finishing pass of the machine tool over the work piece.

FIG. 3 illustrates a modification of the indicating tab 11 in which the layers are of different thicknesses. In this modification, the top layer 12 may be, for example, several thousandths of an inch thick, while the layer 13 which is adjacent the tool setting surface 9 may be of the order of one ten-thousandths of an inch thick.

FIG. 4 illustrates another modification of the indicating tab in which the bottom layer 14 adjacent the surface 9 is beveled while the remaining layers are of uniform thickness. In using a tab of this type, it is apparent that as the operator passes the work tool from left to right, he gradually merges from one color to the next succeeding one along an inclined path and is thus given accurate warning when he approaches the bottom layer 14.

In the modification shown in FIG. 5, tab 11 comprises a plurality of layers of unequal dimensions. In this modification, the top layers 15 is not as wide as the bottom layer 16. This form lends to additional contrast between layers and assists the operator in still more accurately gaging dimensions of his machining operation.

While in the foregoing the indicating tab has been illustrated as attached to a gaging or tool setting surface 9, a separate gaging surface need not be used, but instead a surface of the work piece itself may be employed. Also, in the construction shown in FIG. 1 by using spacers 6 of different heights, a single tool gaging surface 9 may be employed for machining operations of work pieces of different dimensions. Other methods of changing the work surface relative to the gaging surface may also be employed. In all such operations, the indicating tab of my invention provides an improved method of measuring with extreme accuracy a machining operation which not only facilitates the operation by reducing the time required for measuring, but also lowers the hazard of the machining operation. Also, while my invention has been described in connection with a milling machine having peripheral cutting teeth, it is obvious that it is equally applicable to a tool having end cutting teeth, or to other types of machining operations, including grinding, scraping, abrading, or similar material cutting operations.

While I have shown and described particular embodiments of my invention, it will, of course, be understood that I do not wish to be limited thereto since various changes and modifications may be made without departing from my invention, and I contemplate by the appended claims to cover all such changes and modifications as fall within the true spirit and scope of my invention.

What I claim as new and desire to secure by Letters Patent of the United States is:

1. An indicating device for a machining operation comprising a multilayer member adapted to be attached to a tool setting surface positioned adjacent a surface to be machined, adjacent layers of said member being of different colors whereby as a machine tool approaches the surface to be machined the layers are successively removed by the tool to provide a visual indication of the distance to the tool setting surface, and means to facilitate attachment of said device to a surface.

2. An indicating tab for use in a machining operation comprising a multilayer member having an adhesive outer surface to facilitate its attachment to a tool setting surface positioned adjacent a surface to be machined, adjacent layers being of equal dimension and contrasting color whereby as a machine tool approaches the surface to be machined the layers are successively removed by the tool to provide a visual indication of the distance to the tool setting surface.

3. An indicating tab for use in a machining operation comprising a multilayer member adapted to be attached to a tool setting surface, adjacent layers being of different colors and increasing thickness, the layer to be attached to the surface being of minimum thickness whereby as a machine tool approaches the surface the layers are successively removed by the tool to provide a visual indication of the distance to the surface, and means integral with said tab to facilitate its attachment to a surface.

4. An indicating tab for use in a machining operation comprising a multilayer member having an adhesive outer surface to facilitate its attachment to a tool setting surface, adjacent layers being of different dimensions and contrasting colors whereby as a machine tool approaches the surface the layers are successively removed by the tool to provide a visual indication of the distance to the surface.

References Cited in the file of this patent

UNITED STATES PATENTS

| | | |
|---|---|---|
| 2,139,377 | Mull et al. | Dec. 6, 1938 |
| 2,976,716 | De Haven | Mar. 28, 1961 |

FOREIGN PATENTS

| | | |
|---|---|---|
| 448,223 | Great Britain | June 4, 1936 |